Oct. 15, 1968

J. R. COX 3,405,949

TOOL HOLDER

Filed Jan. 12, 1966

INVENTOR.
JOHN R. COX
BY Bosworth, Sessions,
Herrstrom & Knowles
ATTORNEYS

United States Patent Office 3,405,949
Patented Oct. 15, 1968

3,405,949
TOOL HOLDER
John R. Cox, Lakewood, Ohio, assignor, by mesne assignments, to Balas Collet Company, Cleveland, Ohio, a corporation of Ohio
Filed Jan. 12, 1966, Ser. No. 520,293
10 Claims. (Cl. 279—9)

ABSTRACT OF THE DISCLOSURE

A tool holder for supporting tools such as drills, reamers, etc. having a hollow shank into which the shank of the tool extends, the bore in said hollow shank having a longitudinally extending groove, and a tool drive block member slidingly supported in the hollow shank and having driving engagement with the groove and one or one or more recessed faces adapted to be positioned to receive and drive the end of the shank of a tool which is mounted in the tool holder.

---

This invention relates to tool holders and more particularly to adjustable tool stop and driving means for tool holders of the type used in machine tools such as lathes, drill presses, milling machines, etc.

In tool holders commonly employed to support twist drills, reamers, milling cutters or other tools in machine tools, adjustable stops have been provided for setting the distance that the shank of the tool may extend inwardly into the tool holder, thus controlling the length of tool which projects outwardly beyond the end of the tool holder. These stop devices act as abutments to control the longitudinal position of the inner end of the tool shank in the tool holder but do not effect driving connection between the tool and the tool holder and it is an object of the present invention to provide adjustable tool stop means which, in addition, will function to establish a positive driving connection between a tool and the tool holder.

Further objects of my invention include: the provision, in a tool holder of the type described, of a readily removable positive tool driving means which may be easily inserted in the tool holder when a tool having a driving portion of non-circular cross section, such as a square or flattened inner end, is to be used, and which may be removed, if desired, when the tool being used is not provided with a non-circular driving portion at its inner end; the provision of tool driving means for tools having flattened or otherwise non-circular inner ends which is readily adjustable to accommodate tools having different inner drive end size or shape; and the provision of an inexpensive, rugged, adjustable, readily removable, multiple size tool stop and drive means for tool holders of the collet chuck type.

The above and other objects of my invention will appear from the following description of several embodiments thereof, reference being had to the accompanying drawings in which.

Figure 1:
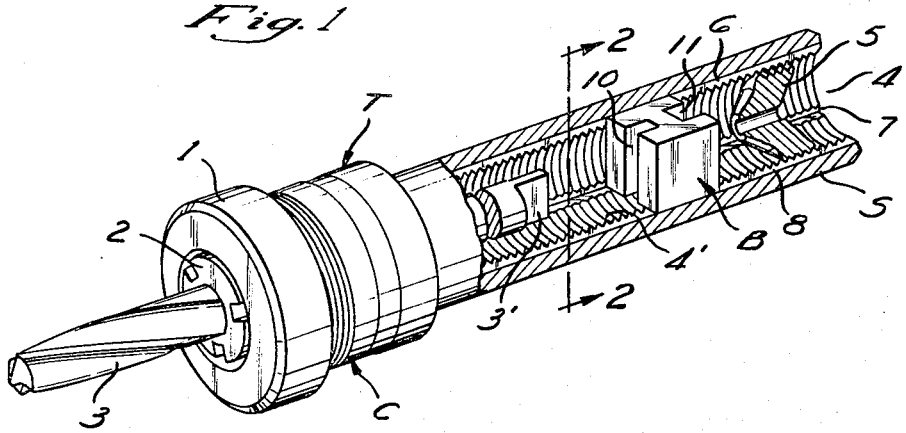
FIGURE 1 is a perspective view, partly in longitudinal cross section, illustrating a tool holder of the collet chuck type incorporating my improved adjustable tool stop and drive means.

Referring now to FIGURE 1, the tool holder T includes a tool gripping portion C, in the form of a collet chuck, carried at the outer end of a tubular cylindrical shank portion S. As the particular type of tool gripping means employed in the tool holder is not a part of the present invention the details thereof are not illustrated or described in detail herein. However, it is pointed out that by loosening the nut 1 the grip of the collet 2 on the tool 3 (shown as a twist drill in the drawings) will be released so that the tool can be moved axially into or out of the hollow tubular shank S of the tool holder. When the tool 3 is positioned longitudinally as desired the nut 1 is tightened, causing the collet 2 to grip and center the tool 3 and frictionally restrain it against rotary or twisting movement in the tool holder.

In order to provide adjustable stop means for positioning the inner end of the tool 3 in the shank S of the tool holder the shank is formed with a center bore 4 extending entirely through its length, this bore being threaded at 4' to receive the threaded adjustable stop member 5 which may be screwed inwardly or outwardly of the shank S by a screw driver or the like inserted from the inner end of the shank and which, when used alone, provides an abutment for the inner end of the tool and controls the distance that the tool may be inserted into the shank, thus providing a convenient means for regulating the distance that the working end of the tool extends outwardly from the outer end of the tool holder T. The adjustable screw stop member 5 does not provide any torsional driving connection between the tool 3 and the tool holder T.

In order to effect a positive driving connection between the tool and the tool holder, and thus reduce the grip on the tool that otherwise would have to be provided entirely by the collet chuck 1–2, the inner end of the tool 3 is formed with an inner end portion 3' of non-circular cross section, the bore 4 in the shank S is formed with a plurality of longitudinally extending slots or grooves 6, 7, 8 and 9, and a drive block B, having a non-circular cross section tool receiving and driving recess 10 formed therein, is slidingly supported in said grooves.

As illustrated, the sliding drive block B is in the form of a cube although, as will be explained later, it may also be of different form. The grooves 6, 7, 8 and 9 are of 90° V-shape in transverse cross section and form tracks or guideways for the block B, four of the parallel right angle edges of which are slidingly supported in said grooves. As the bore 4 and the slots 6, 7, 8 and 9 extend entirely through the tool holder T, the block B may be inserted thereinto from the inner (right hand in FIGURE 1) end of the shank S when the stop screw 5 is removed or from the outer (left hand in FIGURE 1) end thereof when the collet chuck C is disassembled and the nut 1 and collet 2 are removed from the body of the tool holder.

Figure 2:
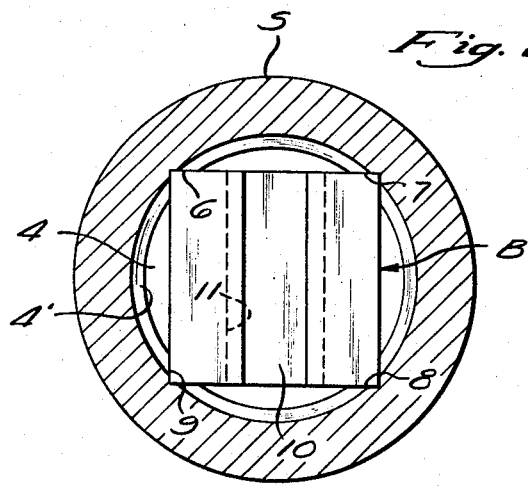
FIGURE 2 is an enlarged transverse cross sectional view taken substantially on line 2—2 of FIGURE 1.

As illustrated in FIGURES 1 and 2, drive block B is provided with two tool receiving and driving recesses in the form of drive slots or kerfs 10 and 11 which are disposed on opposite faces of the body of the block. The slot 10 faces the tool gripping portion C at the outer end of the tool holder T and is of a width to receive and make driving connection with the flattened inner end 3' of the tool 3. The opposite face of the block B from the slot 10 carries the slot 11 and is adapted to abut the inner end of the adjustable stop screw 5 and thus locate the inner end of the tool 3 longitudinally in the tool holder in the desired position. For purposes of illustration the stop screw 5, the drive block B, and the inner end of the tool 3 are shown separated in FIGURE 1 of the drawings but it will be understood that in use the block B will abut and be stopped by the inner end of stop screw 5 and the flattened drive end or tang 3' on the tool 3 will be seated in the slot 10 of the block B.

As the block B may slide freely in the longitudinal V-slots or grooves in the wall of bore 4 of the shank S, the stop screw 5 may be adjusted to any desired position and the block B will be correspondingly located to effect the proper longitudinal positioning of the tool in the tool holder. In order to permit the tool holder to be used with a tool having a drive end of a width different from that which will fit in slot 10, the face of the block B opposite slot 10 is formed with a transverse slot 11 of different width than slot 10.

To change the tool holder to receive a tool having a drive end of the width of slot 11, the block B is removed from the shank S, turned through 180° and dropped back into the bore 4 of the tool holder with the slot 11 facing the outer (left hand in FIGURE 1) end thereof in position to receive the flattened end of the new tool.

Figure 3:
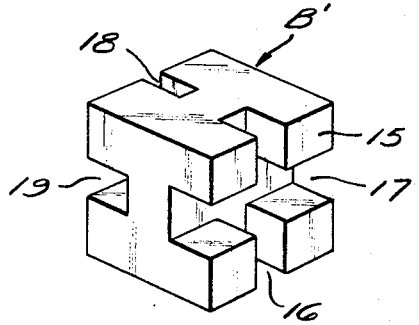
FIGURE 3 is a detached perspective view of a modified form of sliding drive block.

FIGURE 3 illustrates a modified form of drive block, generally indicated at B', having two opposite faces each formed with two different size drive slots therein. Thus the face 15 of block B' is formed with drive slots 16 and 17 of different widths and lying at right angles to each other. The opposite face of the block B' is also formed with two separate drive slots 18 and 19, the width of these slots being different from each other and from slots 16 and 17. Thus, with the block B' inserted in the guide and drive grooves 6, 7, 8 and 9 of the shanke S with the end face 15 thereof facing outwardly, tools with shank ends adapted to fit either slot 16 or slot 17 may be used and, by removing the block B' and turning it through 180° and replacing it so that the opposite face from face 15 is facing outwardly, tools which will fit the slot 18 or slot 19 may be used.

As previously noted, the drive block B has free sliding movement in the grooves 6, 7, 8 and 9 with its four parallel edges in driving engagement with said grooves. When the tool holder of FIGURE 1 is used in vertical position the blocks B or B' could drop out of the bore 4 when the collet C is removed for changing tools and, to provide for resilient retention of the block B in the shank S of the tool holder, I have provided a modified form of block B", seen in FIGURES 4 and 5, having resilient positioning means projecting outwardly from one face of the body of the block and adapted to resiliently engage the threads 4' in the bore 4.

Figure 4:
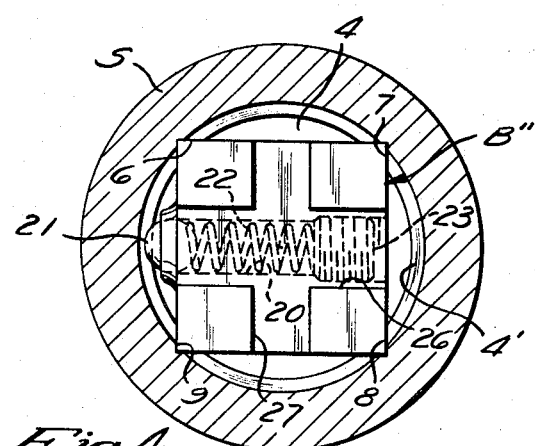
FIGURE 4 is a transverse cross sectional view, generally similar to FIGURE 2, but illustrating another modified form of drive block having spring detent retaining means incorporated therein.
Figure 5:
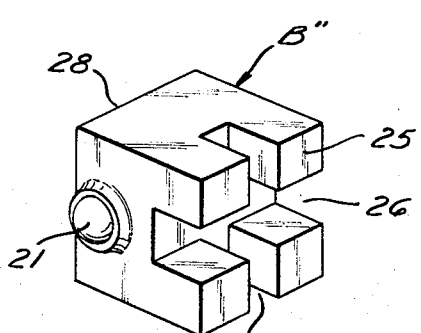
FIGURE 5 is a detached perspective view of the drive block illustrated in FIGURE 4.

This block B" is formed with a transversely extending bore 20 the outer end of which is of slightly reduced diameter to retain a detent ball 21 therein. This ball, projecting partially out of the block B", is seen in FIGURE 4 engaging the threads 4' in the bore 4 of the shank S of the tool holder. A back-up spring 22 is retained in the bore 20 of the block B" by a removable screw plug 23 and serves resiliently to hold the detent ball 21 in its extended position. With this resilient ball type retainer incorporated in the drive block B" the block may be pushed into position in the shank S by the end of the tool 3 or other means, the detent ball slipping over the threads 4' and, by virtue of the back-up spring 22, retaining the drive block B" against falling out of the bore of the tool holder when same is vertically disposed while still permitting longitudinal adjustment of the position of block B".

The block B" also illustrates another modification in the form of drive block which may be employed in my tool holder as it has only one face, 25, thereof formed with two drive slots 26 and 27 of different widths. In this embodiment the rear face 28, which in use abuts the inner end of the adjustable stop screw 5, is not slotted.

As previously noted, if the tool holder T is to be used only with tools that do not have non-circular cross section inner ends the drive block B may be removed and the adjustable stop screw 5 employed in the usual manner to position the inner end of the tool in the tool holder. However, by providing the drive block B, B' or B" having one or more drive recesses formed therein, an effective longitudinally adjustable tool stop and positive torsion drive means is provided which is adapted to receive any one of a number of different tool drive ends. Although the driving blocks illustrated herein are cubic in form it will be understood that they could be of different shape. For example, the drive block could be of triangular cross section in which case three grooves would be formed in the bore of the tool holder shank, or it could be increased or reduced in length in the direction of the longitudinal axis of the tool holder. With such non-cubic drive blocks the tool receiving drive recesses may be formed only on the two opposed end faces whereas, with the cubic blocks illustrated, one or more drive recesses may be formed, if desired, on each of the six faces thereof, thus increasing the possible number of drive recess sizes or shapes which may be incorporated in a single unit.

Although I have illustrated and described in detail several forms of drive blocks embodying my invention it will be understood from the above description that modifications and variations may be made in the form and arrangement of the parts of my improved tool holders without departing from the spirit of my invention, and I do not, therefore, wish to be limited to the specific devices herein shown and described but claim as my invention all embodiments thereof coming with the scope of the appended claims.

I claim:

1. A tool holder having a tool gripping portion and a shank portion, said shank portion having a longitudinally extending threaded bore into which a tool being held in said tool gripping portion may extend, the wall of said threaded bore of said shank portion being formed with a plurality of circumferentially spaced longitudinally extending grooves, a longitudinally adjustable stop member having threaded support in said threaded bore of said shank portion, and a drive block member slidingly supported in said grooves in said bore in said shank portion, said drive block member having a non-circular cross section tool receiving and driving recess formed in one face thereof and disposed in said bore in said shank portion with said recess facing said tool gripping portion whereby the non-circular cross section end of a tool supported therein may be received in and have driving connection with said drive block.

2. A tool holder as described in claim 1 in which said drive block member has a plurality of faces which are provided with tool receiving and driving recesses of different sizes.

3. A tool holder as described in claim 1 wherein four of said longitudinally extending grooves, spaced 90° apart circumferentially, are formed in said bore and said drive block is substantially rectangular in cross section and has four of its edges slidingly supported in said grooves.

4. A tool holder as described in claim 3 wherein said drive block is substantially in the form of a cube.

5. A tool holder as described in claim 3 wherein each of a plurality of the faces of said cubical drive block is provided with a tool receiving and driving recess.

6. A tool holder as described in claim 1 in which said drive block has two parallel opposed faces, said faces each being formed with a tool receiving and driving recess in the form of a transversely extending slot having parallel side walls, the widths of said slots being different and adapted to receive tools having flattened ends of correspondingly different thickness.

7. A tool holder as described in claim 1 in which said longitudinally extending grooves in said shank portion are of 90° V-form in cross section and are spaced apart 90° in said bore of said shank portion, and said drive block member has four right angle edges having a free sliding fit in said V grooves.

8. A tool holder as described in claim 1 in which said bore in said shank portion extends entirely therethrough and is open at both ends and said longitudinally extending grooves extend the full length of said bore whereby said drive block member may be inserted into or removed from said tool holder from either end thereof.

9. A tool holder as described in claim 1 in which said drive block has resilient positioning means projecting outwardly from the body thereof and adapted resiliently to engage the threads of the threaded bore in said shank portion whereby said block may be selectively positioned and retained at the desired location in said bore.

10. A tool holder as described in claim 9 in which said resilient positioning means comprise a detent member movably supported in a transverse bore extending through said drive block, said bore having an outer end portion of reduced diameter to retain said detent member therein while permitting a portion thereof to project outwardly from said block, and spring means in said bore for urging said detent member outwardly of said block, said detent member being disposed to resiliently engage the threads in said bore of said shank portion when said block is positioned in said longitudinally extending grooves therein.

References Cited
UNITED STATES PATENTS

| | | | |
|---|---|---|---|
| 1,894,605 | 1/1933 | Wright | 46—25 |
| 1,953,830 | 4/1934 | Park | 279—1 |
| 339,595 | 4/1886 | Stone | 279—9 |
| 1,110,770 | 9/1914 | Greaves et al. | 279—1 |
| 2,182,411 | 12/1939 | Rosenberg et al. | 279—9 |

ROBERT C. RIORDON, *Primary Examiner.*

J. C. PETERS, *Assistant Examiner.*